United States Patent [19]

Kanotz

[11] 4,425,292
[45] Jan. 10, 1984

[54] HYBRID EXTRUSION METHODS

[75] Inventor: William M. Kanotz, Baldwin, Md.

[73] Assignee: Western Electric Company, Inc., New York, N.Y.

[21] Appl. No.: 306,820

[22] Filed: Sep. 29, 1981

[51] Int. Cl.³ .............................................. B29F 3/10
[52] U.S. Cl. .............................. 264/174; 156/244.13; 425/114
[58] Field of Search ...................... 156/244.12, 244.13; 264/174; 425/113, 114

[56] References Cited

U.S. PATENT DOCUMENTS

| 2,920,351 | 1/1960 | Hardesty et al. | 174/69 |
| 3,024,497 | 3/1962 | Hardesty et al. | 425/152 |
| 3,037,068 | 5/1962 | Wessel | 174/69 |
| 3,229,012 | 1/1966 | Garner | 264/174 |
| 3,554,042 | 1/1971 | Pfister | 74/69 |
| 3,579,608 | 5/1971 | De Coste | 524/296 |
| 3,689,610 | 9/1972 | Nicholson | 425/113 |
| 3,699,498 | 10/1972 | Hardesty et al. | 179/1 PC |
| 3,737,490 | 6/1973 | Nicholson | 264/174 |
| 3,752,614 | 8/1973 | Bremer | 425/113 |
| 3,761,869 | 9/1973 | Hardesty et al. | 339/99 R |
| 4,090,763 | 5/1978 | Congdon et al. | 174/69 |
| 4,148,359 | 4/1979 | Laumbach et al. | 166/261 |
| 4,150,929 | 4/1979 | Brandt | 425/114 |
| 4,206,011 | 6/1980 | Kanotz et al. | 156/244.12 |
| 4,206,611 | 6/1980 | Lang et al. | 62/279 |
| 4,221,756 | 9/1980 | Piper et al. | 264/174 |
| 4,303,734 | 12/1981 | Sullivan | 425/113 |

OTHER PUBLICATIONS

E. I. Bernhardt, Processing of Thermoplastic Materials, Krieger Publishing Co., 1974.
Tadmor, Z. and Klein, I, Engineering Principles of Plasticating Extrusion, Van Nostrand Reinhold Co. Pub., 1970, p. 4.
E. I. Dupont, Wire and Cable Coater's Hand Book, 1968.

Primary Examiner—Donald E. Czaja
Assistant Examiner—W. Thompson
Attorney, Agent, or Firm—F. W. Somers

[57] ABSTRACT

A hybrid extruder provides plastic insulation which is as uniformly and tightly disposed about a substrate as that produced in a conventional pressure extruder and accommodates irregular substrates. The hybrid extruder includes a core tube which is positioned in a die cavity to form a flow passage which includes a restriction to the flow at the end of the core tube to maximize the pressure in the plastic material. The leading end of the core tube is spaced a distance from the land of a die which is substantially less than in conventional pressure extruders to form another portion of the flow passage having a predetermined configuration. After flowing through the restriction, the plastic material expands. This avoids any backflow of the plastic material into the core tube in the event the core tube is to allow the passage of oversized spliced portions of the substrate. Advantageously, this arrangement also prevents the occurrence of melt fracture when extruding relatively high molecular weight plastic materials which because of excellent mechanical and dielectric properties are desired for insulating particular substrates.

3 Claims, 9 Drawing Figures

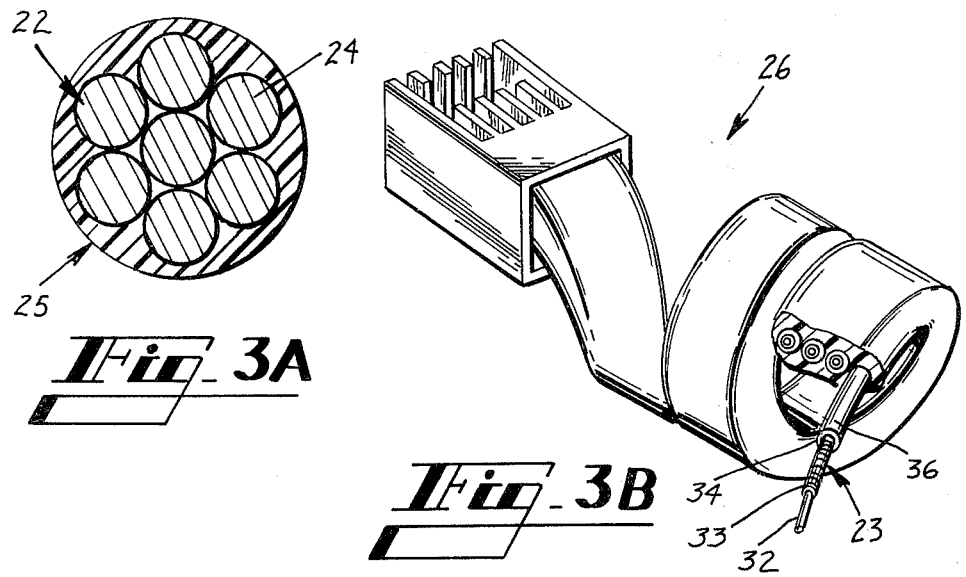
Fig. 3A
Fig. 3B
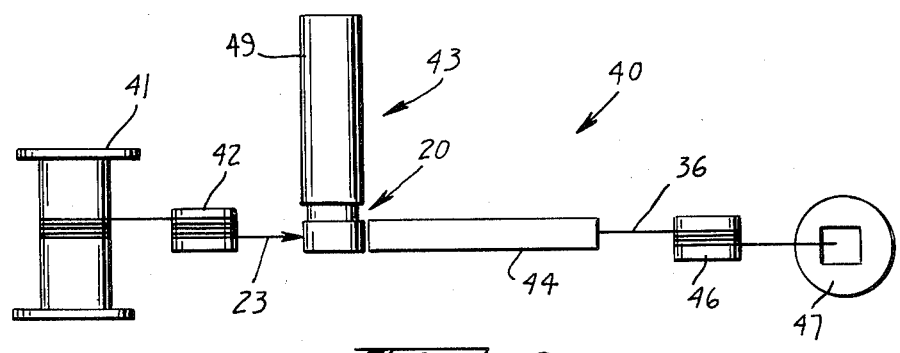
Fig. 4
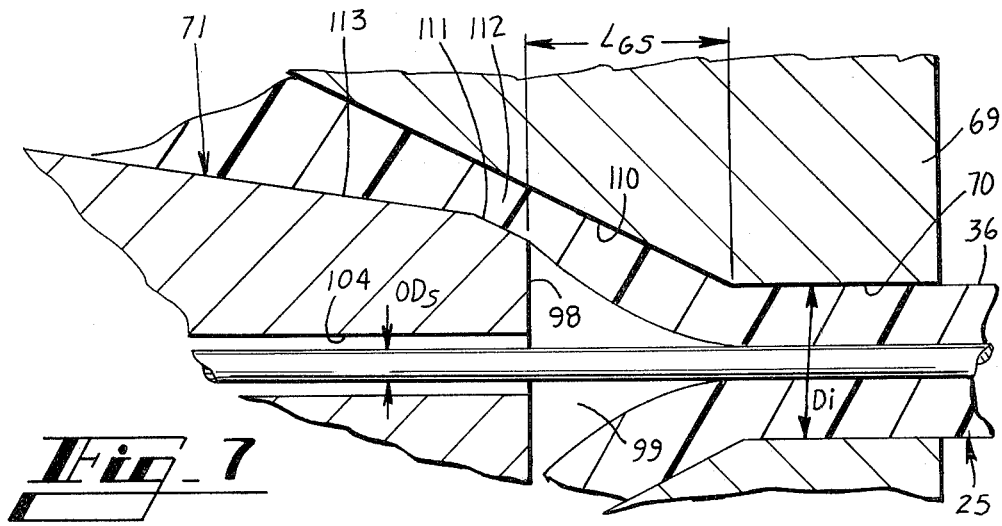
Fig. 7

HYBRID EXTRUSION METHODS

TECHNICAL FIELD

This invention relates to hybrid extrusion methods for insulating substrates. More particularly, it relates to methods which differ from conventional tubing or pressure extrusion techniques for covering a conductor or a plurality of conductors with a polymer material that requires relatively high pressures to extrude.

BACKGROUND OF THE INVENTION

The covering of substrates such as conductors or cores for use in communications with plastic insulating or jacketing materials is generally accomplished with pressure or tubing extrusion tooling. In pressure extrusion, a substrate is moved through a core tube having an opening that is only slightly larger than the substrate. The end of the core tube is positioned within a die cavity and spaced from a land of a die through which the substrate and the plastic extrudate are moved. Pressure extrusion results in a well defined insulative cover which is disposed tightly about the substrate.

In normal pressure extrusion tooling, the moving substrate is exposed to a relatively high melt pressure of the plastic material in a so called "gum space" between the end of the core tube and the die land. Flow of the plastic material is comprised of two components—differential pressure flow and drag flow. The pressure flow is caused by the difference in pressure between the entrance to the land and the exit orifice of the die. Drag flow is defined as the volumetric forward displacement of a viscous material between a stationary and a moving surface such as between the land and the substrate. See E. I. Bernhardt *Processing of Thermoplastic Materials* which was published in 1979 by Krieger Publishing Company.

This relatively high melt pressure requires that the inside surface of the core tube be only slightly larger than the outer dimension of the substrate. This voids any problems in concentricity of the insulation cover and creates a seal which prevents the extrudate from flowing in a direction opposite to the direction of advance of the substrate and into the core tube. Typically, the clearance between the substrate's outer surface and the inner surface of the core tube is 0.001 to 0.002 inch for product sizes in the 0.015 to 0.075 inch range.

Unfortunately, this relatively small clearance prevents any substrate irregularities such as intermittent oversize sections from passing through the tooling. Consequently, particular substrates having a non-uniform cross-section or any spliced, relatively smooth cores cannot be insulated using conventional pressure extrusion techniques. If the core tube is not oversized to accommodate these irregularities, the substrate will break, requiring downtime for operator string-up. On the other hand, if the core tube is oversized, the pressure in a conventional pressure extrusion process will cause a backflow of the plastic material into the core tube.

One such substrate having irregularities is that of a conductor of a telephone cord which is used with customer station equipment. A telephone cord conductor generally comprises a polymeric core having a plurality of tinsel ribbons wrapped helically thereabout. Telephone cords are well disclosed in the prior art such as, for example, U.S. Pat. No. 3,037,068 issued May 29, 1962 in the name of H. L. Wessel, and in U.S. Pat. Nos. 2,920,351 and 3,024,497 issued on Jan. 12, 1960 and Mar. 13, 1962 respectively in the names of E. C. Hardesty and D. L. Myers. Because a tinsel conductor is made with something less than a constant cross-section, the core tube must be oversized.

For these kinds of products, the art has resorted to tubing processes in which the leading end of the core tube generally is flush with or extends beyond the die opening. See U.S. Pat. No. 3,554,042 which issued on Jan. 5, 1971, in the name of E. R. Cocco. But in commonly assigned, copending application Ser. No. 229,434 which was filed on Feb. 29, 1981 now U.S. Pat. No. 4,339,298, the downstream end of the core tube is positioned within the die land. In a tubing operation, the clearance between the inner surface of the core tube and the outer dimension of the substrate, such as an array of tinsel conductors, is large enough to permit oversize substrate sections to be passed through the core tube without jamming. Unlike pressure extrusion, tubing relies solely on differential pressure flow and the extrudate is drawn down about the substrate externally of the die.

A tubing process does not always result in the most acceptable product since tubed covers generally have more size variations and irregular surfaces and are not disposed as tightly about the substrate as in a pressure extrusion process. It should be clear that irregular or intermittently oversized substrates which are necessarily tube-insulated or jacketed are done so at some expense to the overall product configuration and/or performance.

This disadvantage of a tubing process has been aggravated because of recent changes in the materials which are used for insulation and jacketing.

These changes in materials, at least for cords, have come about because of a somewhat recently introduced cord connection arrangement, which is referred to as modularity. Miniature plugs are connected to each end of a cord to facilitate attachment to jacks in telephone instruments and in wall outlets. For example, see U.S. Pat. Nos. 3,699,498 and 3,761,869 issued Oct. 17, 1972 and Sept. 25, 1973 respectively in the names of E. C. Hardesty, C. L. Krumreich, A. E. Mulbarger, Jr. and S. W. Walden and U.S. Pat. No. 4,148,359 issued Apr. 10, 1979 in the name of E. C. Hardesty. With the introduction of modularity, it became necessary to use a different core construction because of a need for a smaller cross-section to be compatible with the plugs. In order to reduce the size of the insulated conductor, the tinsel is insulated with a crystalline, relatively high molecular weight plastic material as disclosed and claimed in U.S. Pat. No. 4,090,763 which issued on May 3, 1978 in the names of W. I. Congdon, J. J. Mottine and W. C. Vesperman and which is incorporated by reference hereinto. A material such as that disclosed and claimed in the above-identified Congdon et al application is available commercially from E. I. duPont Company under the trade name HYTREL ® polyester elastomer.

Extrusion of the above-identified plastic material is characterized by rapid changes in melt viscosity and melt strength with slight variations of polymer temperature. For relatively high molecular weight and/or branched polymers such as HYTREL ® polyester elastomer material, the melt viscosity increases significantly as the pressure increases. These characteristics could cause non-uniform wall thickness and polymer flow pulsations unless suitable control is exercised.

The prior art also shows techniques for controlling the engagement of a tubed HYTREL ® plastic extrudate with the core being enclosed. In U.S. Pat. No. 4,206,611, which issued on June 3, 1980 in the names of W. M. Kanotz et al., an extruded tubular covering is held out of contact with an advancing conductor until the extrudate becomes sufficiently form-sustaining by suitable crystallization. Then, when the crystallized insulation is drawn down on the conductor, any tinsel burrs which protrude outwardly are compressed. This results in a conductor having a continuously concentric insulation and a uniform wall thickness.

There are insulating operations other than these which are used to cover tinsel conductors in which problems have developed because of the plastic which is extruded. For example, a low resistance cord may include a plurality of conductors each comprising wires which are stranded together and insulated. Relatively high pressures are required to extrude some plastic materials such as the hereinbefore-mentioned HYTREL ® plastic material. Such plastic materials have a high molecular weight and are polymerically branched, and normal pressure extrusion techniques may cause dramatic melt viscosity and shear stress increases thereby causing melt fracture.

Melt fracture of particular plastic materials during extrusion is a structural breakdown by fracture within a polymer melt where the critical shear stress becomes abnormally independent of extrusion die orifice size. The result is an insulation cover which is extremely irregular and totally unacceptable.

And yet, these plastic materials such as HYTREL ® elastomers have much to offer. They generally are tough and mechanically resistant to many of the conditions encountered by insulated substrates in the field. It is highly desirable to be able to take advantage of these benefits; but to do so, the problem of melt fracture must be overcome.

It should be clear, that there are several problems in the extrusion of particular plastic materials which must be addressed. Moreover, extrusion techniques need to be reexamined to find solutions to problems caused during the covering of non-uniform substrates. Prior art extrusion technology seemingly lacks tooling which is capable of extruding a substantially uniform, substantially concentric wall about a substrate which is irregular or which includes intermittent overized portions.

SUMMARY OF THE INVENTION

The foregoing needs have been met by the methods of this invention. A method of extruding a plastic material about a substrate includes the step of advancing successive increments of length of a substrate through a core tube which is positioned in a cavity of a die and through a land of the die to an exit orifice. A flow passage for the plastic material is provided through the cavity of the die and through the land. The flow passage has a converging first portion between the tube and a wall of the die cavity which has an annular cross-section that decreases in area toward an end of the tube to cause the minimum area of the first portion of the flow passage to be adjacent to the end of the tube. The end of the tube is spaced a predetermined distance from an entrance to the land to form a second portion of the flow passage having a predetermined configuration. The plastic material is flowed through said passage with the converging first portion causing the maximum pressure in the plastic material to occur adjacent to the end of the tube. Also, the first portion cooperates with the predetermined configuration of the second portion to reduce substantially the pressure differential in the plastic material between the second portion and the exit orifice.

The core tube and the die are arranged to form the second portion of the flow passage, which is called the gum space, such that the plastic material expands into the second portion as it flows past the end of the tube. Because of the predetermined configuration of the second portion of the flow passage, the expanding plastic material does not completely fill the second portion. As a result of the shifting of the location of the maximum pressure from the land to the end of the core tube, backflow of the plastic material toward the core tube and melt fracture of particular polymer materials are prevented.

BRIEF DESCRIPTION OF THE DRAWINGS

Other features of the present invention will be more readily understood from the following detailed description of specific embodiments thereof when read in conjunction with the accompanying drawings, in which:

FIGS. 3A and 3B are end section and perspective views, respectively of stranded and tinsel cords which are read in the communications industry and which may be terminated with modular plugs;

FIG. 4 is an overall view of a manufacturing facility, in schematic form, embodying tooling for insulating substrates;

FIG. 7 is an enlarged view of a portion of the core tube and a wall of the die cavity to show a restriction in the flow passage.

DETAILED DESCRIPTION

Figure 1:
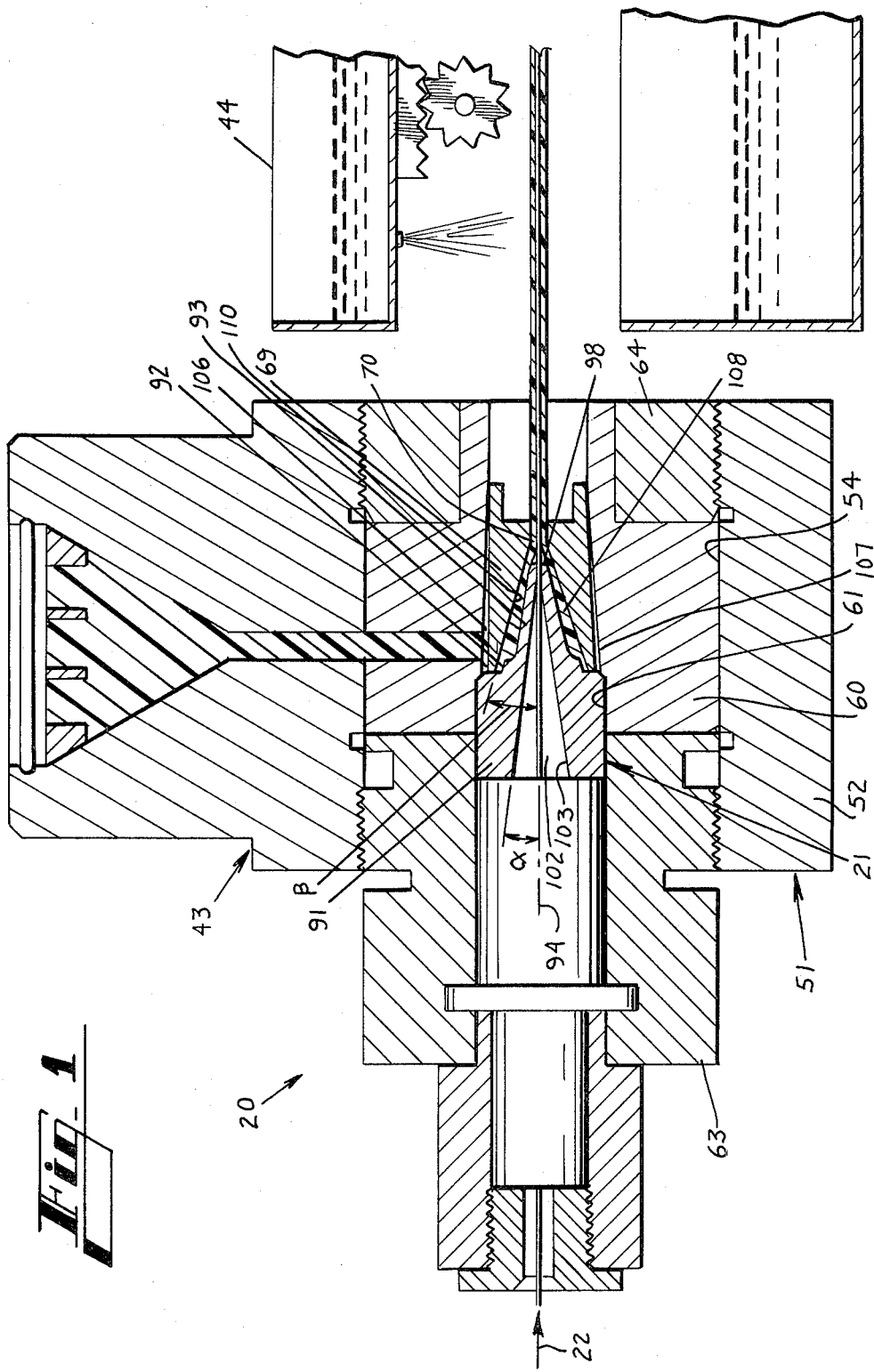
FIG. 1 is an elevational view partially in section to show portions of an extruder crosshead which includes tooling and associated facilities.
Figure 2:
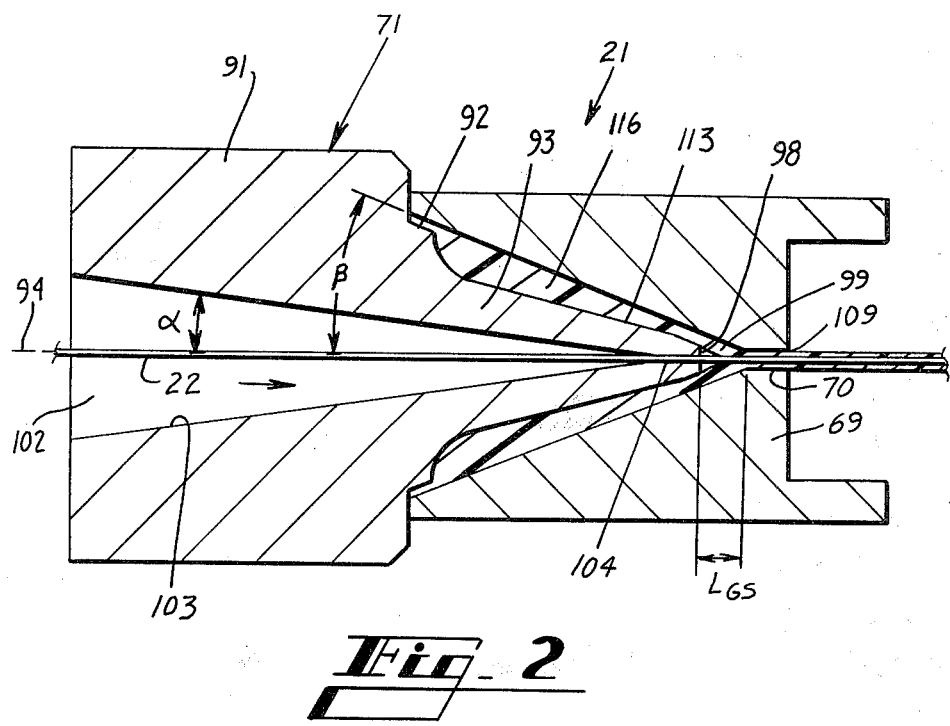
FIG. 2 is an enlarged view of a portion of the extruder crosshead of FIG. 1 to show a hybrid arrangement for covering substrates.

Referring to FIGS. 1 and 2, there is shown an extruder crosshead apparatus, which is designated generally by the numeral 20 and which includes extrusion tooling of this invention that is designated generally by the numeral 21. The apparatus 20 is adapted to extrude an insulation cover of a plastic material over a substrate such as a stranded wire conductor core, designated generally by the numeral 22 (see FIG. 3A) or a tinsel conductor 23 of a cord, designated generally by the numeral 26 (see FIG. 3B). While the invention is described and shown in terms of insulating conductors 24—24 which are stranded together or tinsel conductors 23—23, the principles of this invention are applicable generally to the extrusion of insulative covers about a substrate.

The apparatus 20 of this invention is specially suited to provide a uniformly smooth insulative cover which is disposed tightly about a stranded core. It is also specially suited to provide such a cover about a tinsel conductor 23 notwithstanding the presence of intermittent oversize portions caused by splices.

Each of the insulated tinsel conductors 23—23 includes a nylon multi-filament center core 32 about which a plurality of tinsel ribbons 33—33, made typically from a Phosphor-bronze material, are wrapped spirally. An insulating cover 34 of suitable plastic material generally is extruded over the tinsel ribbons 33—33 to form insulated tinsel conductors 36—36. The insulated conductor 36 is disclosed and claimed in priorly identified U.S. Pat. No. 4,090,763 and the plastic material which comprises the insulation 34 is a, relatively high molecular weight, branched polymer material. An insulation composition suitable for constructing the cord 26 is available presently from the E. I. duPont de Nemours and Company, Inc. of Wilmington, Del. under the trade designation HYTREL ® polyester elastomer material.

The tooling 21 of this invention is specially suited to the extrusion of a relatively high molecular weight polymer about a substrate. Such a polymer is the hereinbefore-described one which is used in the production of cordage for telephone cords. As will be recalled, extrusion of the above-identified plastic material is characterized by rapid changes in melt viscosity and melt strength with slight variations of polymer temperature. For particular polymers such as relatively high molecular weight and/or branched polymers, the melt viscosity increases significantly as the pressure increases. These characteristics could result in non-uniform wall thickness and polymer flow pulsations unless suitable control is exercised.

The extension tooling 21 of this invention produces a product having the attributes of those of pressure extrusion and is capable of accommodating substrates having a non-uniform cross section along their lengths. The characteristics of pressure extrusion are necessary in some applications to provide relatively tight bundling of the stranded conductors in order to maintain acceptable electrical properties. In one example substrate, the outer diameter varied between 0.012 and 0.018 inch with intermittent 0.024 inch splice sections. The required outer diameter of the finished product was 0.037 inch. The intermittent oversized sections of the tinsel conductors 23—23 may come about because of splices.

Referring now to FIG. 4 of the drawings, there is shown a simplified schematic view of a system designated generally by the numeral 40 for producing an insulated substrate in accordance with this invention. The system 40 includes a supply 41 of a tinsel core, an accumulator 42, an extruder, designated generally by the numeral 43 including the crosshead 20 for extruding the insulation cover 38 over the stranded core, a cooling system 44, a capstan 46 and a takeup 47. The supply 41, the accumulator 42, the cooling system 44, the capstan 46 and the takeup 47 are all of conventional design and are well known in the art. For insulating a stranded wire core, individual wires may be fed from individual supply spools, and bundled together in a wire guide adjacent to the extruder crosshead 20.

Referring to FIG. 4 and again to FIGS. 1 and 2 of the drawings, it is seen that the extruder 43 includes a barrel 49 in which is mounted a screw of the type for example shown in U.S. Pat. No. 3,579,608, incorporated by reference hereinto, which is rotated by suitable source of power (not shown) for the purpose of forcing the plastic material through the extruder crosshead 20. The crosshead 20 in which is mounted the tooling 21 comprises a body member 32 provided with an opening which forms a continuation of the bore in the barrel 49 and which communicates with a cylindrical bore 54 formed in the body member 52 transversely with respect to the barrel.

A cylindrical tool holder 60 having a central bore 61 which extends coaxially with respect to the bore 54 is removably mounted in the body member 52 by a back head nut 63 and an adapter nut 64. The tool holder 60 supports a die 69 having a land 70 and mounts a core tube 71 in axial alignment with the die 69. Typically, the length of the land 70 as measured in a direction along a path of travel of the conductor is in the range of 0.20 cm to 0.25 cm. The tool holder 60 is designed to deflect insulation material from a direction flowing downwardly as viewed in FIG. 1 to a direction flowing to the right around the core tube 71 and through the die 69 to form concentrically the covering around the substrate being advanced therethrough.

Figure 5:
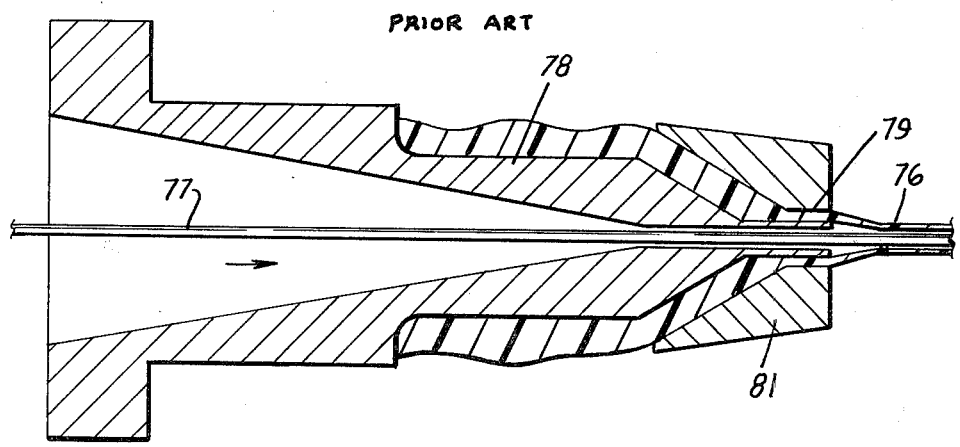
FIG. 5 is an enlarged view in section of a portion of a prior art tubing arrangement.

In a conventional tubing operation shown in FIG. 5, a plastic material 76 is drawn down on a substrate 77 being advanced out of the extruder 43 since the substrate is being advanced at a higher rate than that of the extrudate. The plastic melt emerging from the extruder 43 is referred to as the extrudate. See, for example, page 4 of *Engineering Principles of Plasticating Extrusion* by Z. Tadmor and I. Klein published in 1970 by Van Nostrand Reinhold Co., and the hereinbefore identified *Processing of Thermoplastic Materials*, both of which texts are incorporated by reference hereinto. As is seen in FIG. 5, a core tube 78 has a portion which generally extends beyond or is flush with an exit orifice 79 of a die 81.

Figure 6:
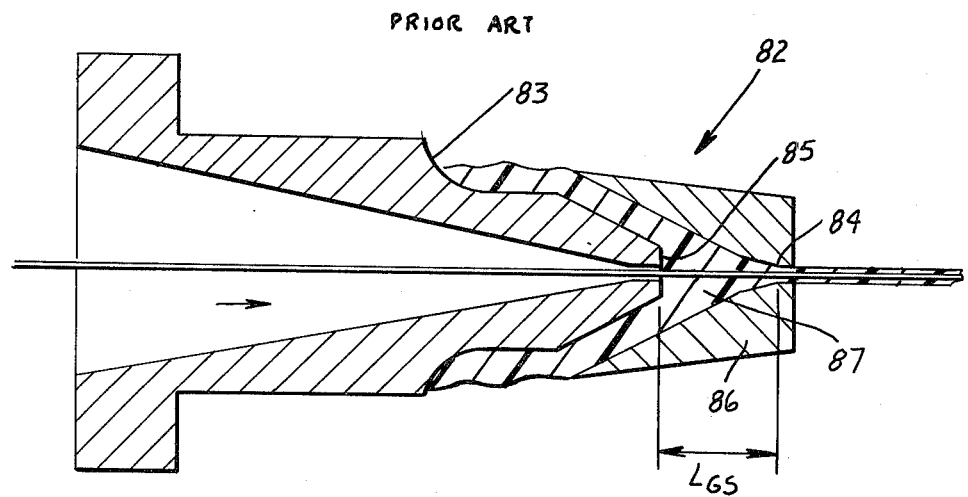
FIG. 6 is en enlarged view in section of a portion of a prior art pressure tooling arrangement.

On the other hand, in a normal pressure extruder 82 which is shown in FIG. 6, a tip 85 of a core tube 83 is spaced a substantial distance from a land 84 of a die 86. For example, in a typical pressure extruder, that distance, designated $L_{GS}$ and referred to as the length of a gum space 87, may be as high as about 0.25 inch. On page 48 of the first edition of the *Wire and Cable Coaters' Handbook* published by E. I. DuPont in 1968, a gum space length of 100–135 mils was disclosed to be best for thin wall wire coatings. This spacing is used to allow the flow of the plastic material to stabilize and the melt pressure to maximize before it enters the land 84 of the die 86. This creates a pressure differential between the gum space 87 and the orifice of the die 86.

Referring again to FIGS. 1 and 2, there is shown in detail the core tube 71 and the die arrangement of the hybrid extrusion tooling 21 of this invention. The core tube 71 includes a stepped, tapered conical member having an enlarged base portion 91, and conically shaped portions 92 and 93 having successively reduced diameters but with outside walls thereof being generally converging toward a centerline 94 of the core tube 71. The core tube 71 is supported in the cavity 61 in the crosshead 20 such that a free end 98 of the portion 93 is spaced a distance $L_{GS}$ from the beginning of the land 70 to form a gum space 99. This distance, as will be recalled, is referred to as the length of the gum space 99. It has been found that a distance in the range of about 0.020 to about 0.050 inch is suitable for the tooling 21 of this invention.

The core tube 71 is constructed with a tapered bore 102 extending through the portions 91–93 and is defined by an inner surface 103. Typically an angle $\alpha$ between the inner surface 103 and the centerline of the core tube 71 is in the range of about 7° to 9°. The bore 102 communicates with a relatively short length cylindrical bore 104 which opens to the free end 98 of the core tube 71.

A useful ratio for comparing the hybrid extruder tooling 21 of this invention with that of prior art extruders is the ratio of the diameter of the core tube bore 104 with the diameter of the substrate to be insulated. In the prior art, the ratio typically has been on in the range of 1.0-1.05 to 1. For the hybrid extruder, this ratio can be as high as 4 to 1 which of course renders the extruder capable of passing larger oversize portions than was heretofore possible.

The die holder 60 is constructed with a cavity 106 which is defined by a side or bearing wall 107. The die 69 is supported in engagement with the surface 107 and includes a cavity 108 that has a frustoconical configuration and that converges at some predetermined angle toward the land or throat 70 adjacent an opening 109 of the die 69. Typically, the angle $\beta$ formed between a line of generation of a wall 110 which defines the cavity 108 and the centerline 94 of the core 71 is on the order of magnitude of 10° to 15°.

Figure 8:
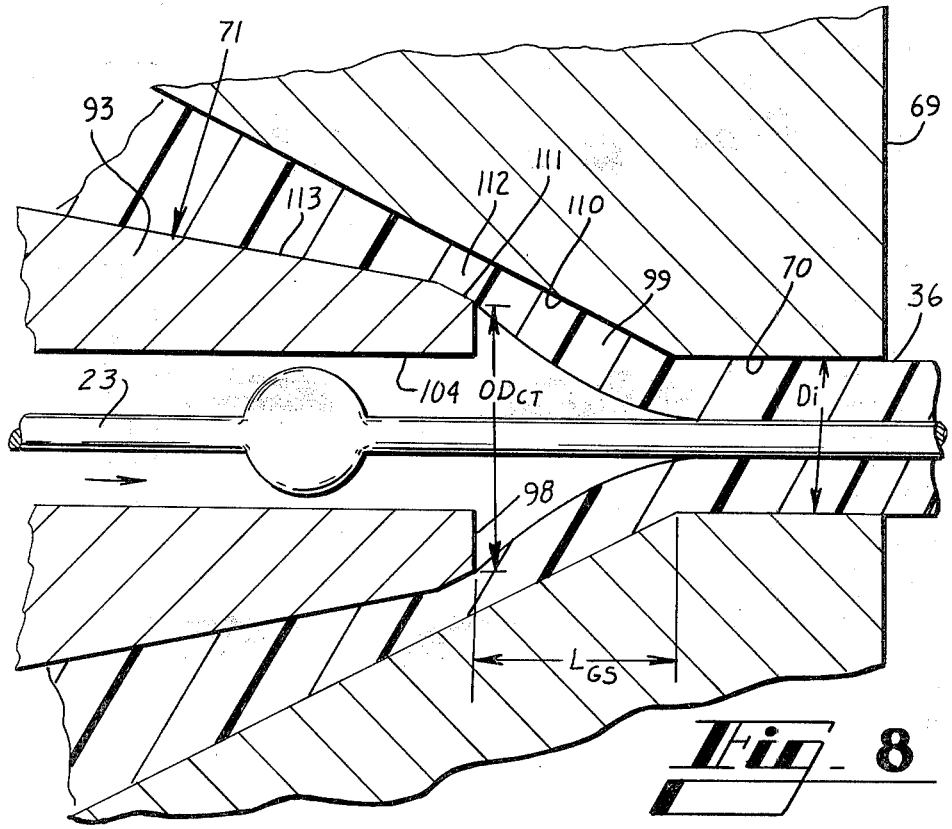
FIG. 8 is an alternate embodiment of the arrangement shown in FIG. 2 with provisions for permitting the passage of intermittent irregularities.

It should be observed from FIGS. 7 and 8 that the leading peripheral edge of the core tube 71 is beveled to form a flat portion 111 having a width of about 0.020 inch. Moreover, the flat portion is spaced from the wall 110, which defines the cavity 108, a uniform distance that is in the range of about 0.020 to 0.035 inch. The constant cross-section of the flow passage between the surface 110 and the beveled portion 111 of the core tube 71 creates a concentric annulus of stable polymer flow at a uniformly high velocity.

This arrangement of the flat portion 111 of the core tube 71 and the die cavity wall 110 provide a restriction 112 to plastic flow. The restriction 112 is sufficient to cause the pressure of the plastic material to attain a maximum value as it flows therethrough. The flow passage between the cavity wall 110 and a frustoconical surface 113 of the core tube 71 gradually decreases to the restriction 112. As a result, the velocity, melt viscosity and pressure in the plastic material increase to a maximum within the restriction 112.

This is unlike a conventional pressure extruder. There, the distance between the tip of the core tube 71 and the cavity wall is on the order of 0.100 inch and the greatest pressure occurs at the land of the die. In short, prior art tooling was designed not to restrict the flow in the vicinity of the leading end of the core tube. Also, as will be recalled, the length of the gum space 99 was substantially longer than in the tooling 21 of this invention. Use of the tooling 21 results in a continuously concentric insulated conductor. This result had not been attainable before in extrusion tooling having oversize core tubes to permit the passage of the enlarged substrate portions.

The tooling 21 of this invention defines a flow passage for the plastic material. A first portion 116 is formed between the converging surfaces 113 and 110 of the core tube 71 and the die cavity and terminates in the restriction 112. A second portion is the gum space 99 which is specially configured and which has the predetermined length $L_{GS}$. The flow passage also includes the land 70 of the die 69.

The plastic material is flowed along the first portion 116 of the flow passage between the wall 110 of the die cavity 108 and the frustoconical surface 113 of the core tube 71 which are spaced apart in a converging direction. The first portion of the flow passage has an annular cross-section which decreases in area in a direction toward the free end 98 of the core tube 71. The plastic material flows at an increasing velocity to the end face of the core tube 71 and the pressure of the material on all sides of the portion of the core tube is balanced. The substrate such as the stranded core 22 is guided from the core tube 71 substantially in alignment with the cylindrical passage 109 of the die 69 so that it is centered generally within the extrudate as it is advanced out of the cylindrical bore and the insulation cover material is extruded through the cylindrical passage in the die.

Beyond the end of the core tube 71, the plastic melt is flowed through the gum space 99 which ends at the entrance to the land 70 of the die 69. In this second portion of its flow passage, the plastic melt is restrained by only one surface, the inner surface 110 of the cavity 109. In the gum space 99, between the free end 98 of the core tube 71 and the entrance to the land, the plastic melt expands volumetrically as it senses a drop in pressure. The pressure drop also causes the melt viscosity to decrease significantly as the plastic material recovers from its elastic deformation.

Since the configuration of the gum space 99 is significant to the tooling of this invention, it becomes important to characterize it relative to that of other conventional tooling. One measure of its configuration is the ratio of the length, $L_{GS}$, of the gum space to the inner diameter $D_i$ of the die. Assuming a $D_i$ of 0.038 inch, the ratio for conventional tooling falls in a range of about 2.5-3.5 to 1. For the hybrid extruder of this invention, the ratio falls in a range of about 0.5-1.3 to 1 or simply 0.5 to 1.3 expressed as a number.

Another characterization can be had by a ratio in which the numerator is the outer diameter $OD_{CT}$ of the core tube 71 at its beveled free end less the outer dimension or diameter $OD_s$ of the substrate and the denominator is the length of the gum space. Assuming an $OD_s$ of about 0.02 inch and an $OD_{CT}$ which may be as low as 0.03 inch for some knife edge versions to a high of about 0.125, that ratio for conventional pressure extruders is in the range of about 0.5 to 0.8, always less than 1. For the hybrid extruder of this invention, with a gum space length falling in the range of 0.02 to 0.05 inch and a core tube $OD_{CT}$ of 0.07 to 0.09 inch, this ratio is in the range of 1.0 to 2.5, always at least 1.

As a result of the configuration of the gum space 99, the plastic melt is directed toward the substrate at a velocity which is slightly less than that of the substrate and at only a slight angle thereto. The plastic melt does not fill completely the gum space and meets the substrate just behind the land 70 of the die 69. The configuration and length of the gum space portion of the flow passage is such that pressure and viscosity drop significantly before the substrate is able to impart drag forces to it and pull it through the die. This is unlike a conventional pressure extruder where the core tube is spaced from the land a distance which is sufficient to allow a pressure increase in the gum space and create a pressure differential that contributes significantly to the flow through the die. With the arrangement of this invention, the differential pressure flow due to a pumping of the plastic has been reduced substantially. In one embodiment, the pressure differential is virtually negligible.

Inasmuch as the differential in pressure between the gum space at the entrance to the land and the die orifice may be substantially negligible, the plastic melt is moved through the die land by drag flow forces caused by its engagement with the substrate. The plastic melt covers the substrate uniformly and smoothly. Because of the relatively low gum space pressure, backflow of the plastic melt into the core tube is prevented which could cause a problem if an oversize core tube 71 were used to accommodate a spliced substrate such as that shown in FIG. 8.

For relatively high molecular weight and/or branched polymer materials such as the hereinbefore-described HYTREL ® plastic, the tooling arrangement of this invention prevents melt fracture. By substantially eliminating the differential pressure prior at the land 70 along with creating volumetric expansion along with melt viscosity reduction past the point of greatest pressure, the shear stress within the land is reduced substantially over that of conventional tooling. The critical shear stress within the polymer is reduced sufficiently to prevent structural breakdown of the polymer by fracture.

The restriction 112 that is created in the flow passage between the cavity wall 110 and the core tube 71 cooperates with the specially configured gum space 99 to provide the excellent results achieved with the tooling 21 of this invention. It has been found that the restriction 112 to the flow passage would not, without the specially configured gum space, provide a relatively smooth insulative cover. This most likely occurs because the drag flow within the die 69 becomes dominant due to the substantial reduction in the differential pressure flow. By positioning the tip of the core tube 71 adjacent to the land of the die in accordance with this invention, the drag flow is controlled relative to the differential pressure flow and any impediment to a relatively smooth surface is removed.

The product which is made by the methods and apparatus of this invention is also unique, particularly that of a high molecular weight and/or branched polymer insulation over a stranded core. Requirements for some of the more recently developed cords include relatively low electrical resistance and improved mechanical properties when terminated with a modular plug.

It has been found that the product of this invention has several important properties. A cord constructed of such conductors exhibits improved resistance to bending and longer flex life at its entry into the plug. The insulation cover is also capable of being pushed into the openings of the plug without fraying the insulation. Moreover, cold flow and fracture of the insulation adjacent to strain relief systems in the plug have been eliminated.

For a conductor which is insulated with HYTREL ® plastic in accordance with this invention, the plastic surface has a matte finish. This causes the conductor plastic to lock into a subsequently extruded plastic jacket. As a result, slippage between the conductors and the jacket is prevented and metal bands, which are clamped over the jacket for some cord uses, remain secured to the cord with substantially improved resistance to pull.

Tubing is not a viable alternative for insulating stranded conductors for some uses. A tubed insulation does not lock in around the conductors whereas the hybrid extruded plastic material is disposed tightly about and in the interstices of the stranded wires. The absence of suitable lock-in could cause problems with respect to termination and also allow suck-back of the wires within the insulation.

It is to be understood that the above-described arrangements are simply illustrative of the invention. Other arrangements may be devised by those skilled in the art which will embody the principles of the invention and fall within the spirit and scope thereof.

What is claimed is:

1. A method of extruding a plastic material about a substrate, said method including the steps of:

advancing successive increments of length of a substrate through a core tube which is positioned in a cavity of a die and through a land of the die which has a circular cross-section to an exit orifice;

providing a flow passage having a converging first portion which is formed between the core tube and a wall of the die cavity and which has an annular cross-section that decreases in area toward an end of the core tube to cause the minimum area of the first portion of the flow passage to be adjacent to the end of the core tube;

spacing the end of the core tube which has a circular cross-section a distance from an entrance of the land to form a second portion of the flow passage having a predetermined configuration, the distance being such that a ratio having a numerator comprising the difference between an outer diameter of the end of the core tube and an outer dimension of the substrate and having a denominator of the distance is at least 1 and such that ratio of it to an inner diameter of the die is in the range of about 0.5 to 1.3; and flowing the plastic material through the flow passage with the converging first portion causing the maximum pressure in the plastic material to occur adjacent to the end of the core tube and cooperating with the predetermined configuration of the second portion to cause a controlled expansion of the plastic material without filling the second portion of the flow passage to thereby reduce substantially the pressure differential in the plastic material between the second portion and the exit orifice and to allow an inner diameter of the core tube to be substantially larger than the outer dimension of the substrate being advanced therethrough.

2. The method of claim 1, wherein the minimum area of the first portion of the flow passage is caused to occur over a finite distance and through an annulus having a constant width.

3. The method of claim 1, wherein the flow of the plastic material comprises a drag flow component which is caused by its engagement with the advancing substrate and a differential pressure flow caused by the difference in pressure between the land entrance and the exit orifice and wherein said differential pressure flow is substantially negligible.

* * * * *